Figure 1:
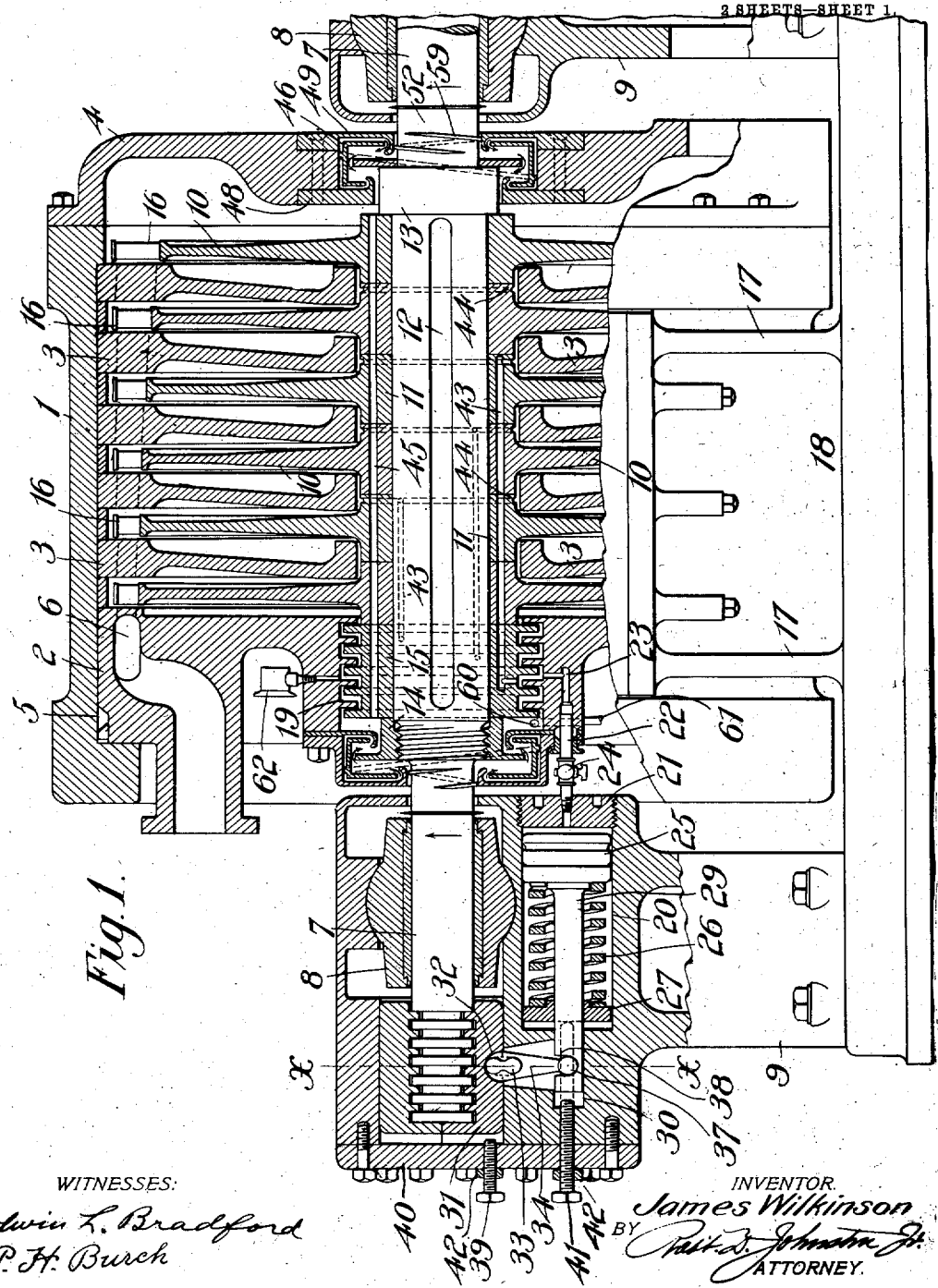

No. 861,926. PATENTED JULY 30, 1907.
J. WILKINSON.
PACKING FOR ROTARY MOTORS.
APPLICATION FILED JAN. 12, 1906.

2 SHEETS—SHEET 1.

WITNESSES:
Edwin L. Bradford
P. H. Burch

INVENTOR.
James Wilkinson
BY
ATTORNEY.

No. 861,926. PATENTED JULY 30, 1907.
J. WILKINSON.
PACKING FOR ROTARY MOTORS.
APPLICATION FILED JAN. 12, 1906.
2 SHEETS—SHEET 2.
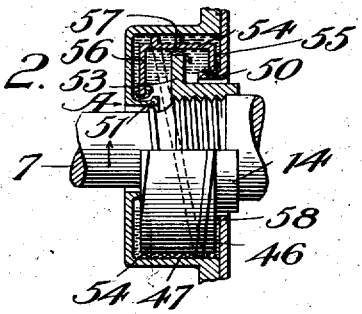
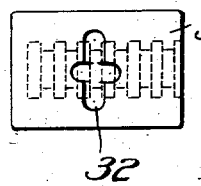
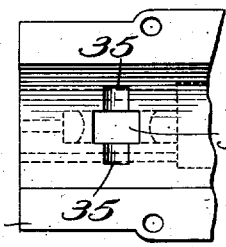
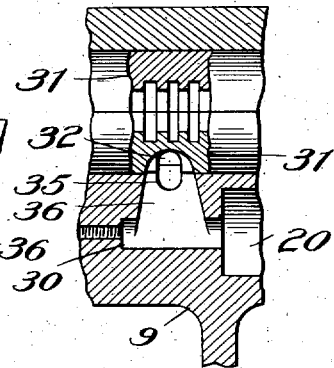
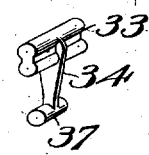
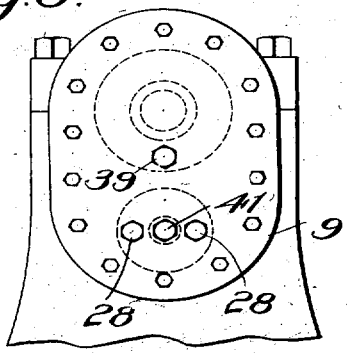
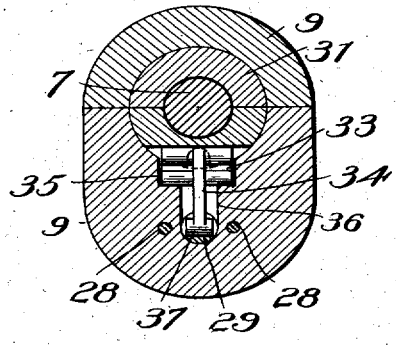
WITNESSES:
Edwin L. Bradford
P. H. Burch
INVENTOR
James Wilkinson
BY
[signature]
ATTORNEY

UNITED STATES PATENT OFFICE.

JAMES WILKINSON, OF PROVIDENCE, RHODE ISLAND, ASSIGNOR TO WILKINSON TURBINE COMPANY, A CORPORATION OF INDIANA.

PACKING FOR ROTARY MOTORS.

No. 861,926.      Specification of Letters Patent.      Patented July 30, 1907.

Application filed January 12, 1906. Serial No. 295,766.

*To all whom it may concern:*

Be it known that I, JAMES WILKINSON, a citizen of the United States, residing at Providence, in the county of Providence and State of Rhode Island, have invented new and useful Improvements in Packing for Rotary Motors, of which the following is a specification.

My invention relates to packing means for rotary motors and particularly for elastic fluid turbines, and comprises improvements in both mechanical and liquid packing devices for use generally with rotatable shafts.

One object of my invention is to provide an automatic governor for controlling leakage in rotating shaft packing, said governor, in its preferred form, comprising a fluid motor which moves sensitive to variations in pressure of the leakage fluid acted upon by the packing and automatically adjusts the clearances between stationary and rotating parts or valves the leakage of the fluid at different points in the packing.

A further object of my invention, which pertains peculiarly to steam turbines, is the combination with a packing, in which the leakage is governed as above, of conduits or passages leading from points in said packing, where its automatic action should maintain determined pressures of the leakage fluid, to points in the working passage of the turbine where slightly lower pressures normally obtain in the manner described and broadly claimed in a pending application, Serial No. 377,428, filed June 5th, 1907.

My invention also includes certain improvements in a liquid packing means.

In the accompanying drawings illustrating the preferred embodiment of my present invention:—Figure 1, is a side elevation of a turbine provided with my improvements, the casing of the turbine and the bearing frames being broken away to illustrate the internal arrangement of parts in vertical sectional elevation. Fig. 2, is a detail view of the pump element in the liquid packing, shown partly in elevation. Fig. 3, is a bottom view of the thrust bearing. Fig. 4, is a plan view of the support for the thrust bearing. Fig. 5, is a side view of the bearing and supporting frame in vertical section with the adjusting lever removed. Fig. 6, is a detail view of the adjusting lever. Fig. 7, is a vertical sectional elevation along the line *x—x*, Fig. 1. Fig. 8, is an end view of the bearing frame for the high pressure.

Similar reference numerals refer to similar parts throughout the drawings.

In the accompanying drawings I have illustrated the several improvements constituting my present invention in their coöperative relation in an elastic fluid turbine of the multi-stage, non-condensing axial flow type. This turbine comprises an outer split shell or casing 1 having shouldered abutments between which the supply head 2 and the several diaphragm partitions 3 are held. The exhaust head 4 is bolted or otherwise secured to the end of the shell. Suitable packing, as 5, prevents leakage between the head 2 and the shell. I admit the motor fluid to a steam chest 6, formed in the head 2, from which a plurality of nozzles, indicated in dotted lines, lead through the supply head and diaphragms, forming a working passage for the fluid of gradually increasing proportions. A rotatable shaft 7 passes through the supply and exhaust heads, being packed in the manner hereinafter described, and supported in bushings 8, mounted in bearing frames 9. A plurality of bucket wheels 10 having flanged hubs 11, are mounted upon the shaft, being secured thereon against rotation by a key (not shown), which is inserted in a longitudinal slot 12 in the shaft. The ends of the several wheel hubs are faced off and abut, being held against longitudinal movement between the shoulder 13 at the exhaust end of the shaft and the nut 14, which is screwed onto a reduced threaded portion of the shaft near its high pressure end and engages a ring and groove packing sleeve 15, which abuts against the wheel hub in the high pressure stage. The several wheels are provided with buckets 16 which move in the path of the fluid in the working passage. The shell 1 is supported by a standard 17 mounted on a bed plate 18, which also supports the bearing frames 9.

The packing for the high pressure or supply end of the turbine is of the ring and groove or interleafed gland type, the sleeve 15 being provided with a plurality of annular ring projections which are disposed within an equal number of annular or ring groove chambers 19 formed in the inner wall of the shaft opening in the supply head. This form of packing is commonly used in this art and in selecting it, it will be understood that its equivalent may be substituted without affecting the operation of my invention. As the fluid tends to leak through the packing from the high pressure stage its volume and pressure is varied in its flow through the several ring chambers 19, the volume of the leakage and the pressures existing in the several ring chambers 19 being determined by the clearances between the packing rings. It being desired, for the purposes of my invention, to govern the volume of leakage and also the pressures of the leakage fluid it is desired to maintain in the several chambers 19, I propose to provide a means for effecting automatically a relative adjustment of the packing rings sensitive to pressure conditions of the leakage fluid acted upon by the packing. This will have the effect, in the illustrated construction, of varying the clearances between the stationary and rotating rings, increasing the clearances as the pressure in the packing falls and diminishing them as the pressure rises. As one means for effecting this automatic adjustment, I provide a cylinder 20 formed in the bearing frame 9 for the high pressure end of the shaft, and preferably disposed below and parallel with the shaft bushing 8. The end of this cylinder towards the high pressure packing is closed by a screw head 21, having a central opening from which a pipe 22 leads to a passage 23 in the supply head which opens at any desired point into the packing. I provide a valve 24, in the pipe 22, which when open admits the leakage fluid from the packing into the cylinder. A piston 25, movable pressure tight in this cylinder, is acted upon by the pressure of this fluid while a spring 26 engages the outer face of the piston and tends to move it inwardly or towards the turbine, in opposition to the leakage fluid pressure. This spring seats against a washer 27 which is engaged and adjusted by screws 28 to vary the tension on the spring 26. The piston moves a piston rod 29, which passes through the washer 27 and enters a circular chamber 30 forming a continuance of the chamber 20. This chamber is disposed below the thrust bearing 31 at the high pressure end of the shaft 7. As seen on Sheet 1 of the drawings the bottom face of this thrust bearing is recessed at 32 in a peculiar manner, the recess being adapted to receive the upper portion of the head 33 of a lever 34. This head 33 extends transversely to the body of the lever and is rounded above and below, the lower or fulcrum portions thereof being adapted to rest in two semi-circular grooves 35 in the seat of the thrust bearing, formed on each side of an opening 36 leading downwardly through said seat to the chamber 30. The body portion 34 of the lever is narrow so that this opening 36 need not be wide. The lower portion of the lever, which projects into the chamber 30, has a cylindrical bearing end 37 which rests in a semi-circular groove in the rod 29. I thus provide a leverage connection between the rod 29 and the thrust bearing 31, the purpose of which is both to multiply the power of the motor and to cause said thrust bearing to adjust the shaft 7 axially upon the movement of the piston 25 in its cylinder. The thrust bearing 31 is of the ordinary construction, engaging a plurality of integral collars on the shaft 7 so that any movement imparted it is also imparted to the shaft and sleeve 15. Other means may be used to effect this adjustment of a part of the packing, my invention in its broadest aspect including the direct connection of the motor to part of the packing or the provision of means to make either or both parts of the packing self adjusting.

I provide means to limit the axial movement of the shaft in both directions, and to lock the packing rings and shaft in any desired position, these means comprising a set screw 39, mounted in the end plate 40 for the bearing frame and adapted to engage the thrust bearing and limit its outward movement, and a second set screw 41, provided with a lock nut 42, and inserted in the end plate and bearing frame through which it passes and enters the outer end of the chamber 30, where it acts to limit the outward travel of the rod 29 at any desired point and thereby limit the inward play of the thrust bearing 31. I provide a lock nut 42 for the screw 39.

In operation, the pressure in the packing, acting against the spring 26 which is adjusted to any desired tension, will, through the instrumentalities described, adjust the shaft and accordingly the sleeve 15 so that the rings thereon are moved to vary the clearances between their inner faces and the sides of the chambers 19, or to vary the throttling action of the packing devices so as to permit the desired volume of leakage and maintain a substantially uniform pressure in the ring chamber or point in the packing from which the passage 23 leads. In other words, I provide a governor for a rotating shaft packing controlled by the pressure of the leakage fluid and acting to prevent substantial variances in the volume and pressure of the leakage at the controlling point or other points in the packing.

While this automatic manner of governing the leakage is of advantage in any character of rotating packing, it is of particular value when it is proposed to return the leakage fluid or parts thereof back into the turbine. For it is evident that the automatic devices for governing the leakage in the packing tend to prevent material variations in the pressure or volume of the leakage at any given point in the packing. It follows therefore that the leakage fluid may be withdrawn from any one of these points and, being substantially constant in pressure, may be introduced into the working passage at the point where the normal pressure is only a little less than that of the leakage fluid. I consider that the most satisfactory conditions as to economical operation will obtain when the packing is so arranged that it has stages corresponding to the stages of the turbine and communicating therewith, and is adapted to maintain the leakage fluid in the packing stages at such a pressure that it can be utilized at highest efficiency in the turbine stages into which it is discharged.

My preferred means for effecting this and which forms the subject matter of my pending application aforesaid is the provision of a plurality of passages 43 which lead through the packing sleeve and abutting wheel hubs 11 and establish communication between the several ring chambers 19 and the several stages following the initial stage. The passage or passages from the inner chamber 19 open into an annular groove 44 in the hub 11 of the second wheel opposite the shaft opening in the diaphragms between the second and third stages. In the same manner the passages from the second chamber 19 open into the groove 44 opposite the third diaphragm and etc., the outer chamber or end of the packing communicating with the exhaust end of the turbine through a passage 45. A certain amount of steam will leak past the packing sleeve 15, and will exhaust from the outer end of the high pressure packing through passage 45. This passage being free tends to maintain the exhaust pressure of the turbine at the outer end of the high pressure packing. As before stated, the turbine illustrated is designed to operate non-condensing and the steam in the exhaust end, as well as the outer end of the high pressure packing, will be substantially at the pressure of the atmosphere. In condensing turbines, the passages 45 may be led to a point where a pressure approximately that of the atmosphere normally obtains.

It is desirable to seal the joint between the shaft and both the supply and exhaust heads against the leakage to or from the atmosphere, and I prefer to effect this by liquid packing means constituting an improvement for the liquid packing disclosed in my Letters Patent No. 822,802. This liquid packing, as applied to the exhaust end, comprises a rotating centrifugal pump element 46 disposed in an annular pump chamber 47 surrounding the shaft and formed in the exhaust head, being inclosed at the sides by two annular detachable plates 48 and 49, which have inwardly disposed cupped flanges 50 and 51 parallel with the shaft and respectively disposed opposite the shoulder 13 and a reduced portion 52. The pump element comprises a web portion 53, which is fastened, so as to make a pressure tight joint, to the outer face of the shoulder 13 and formed integral with an annular rim portion 54 which rotates in close proximity to the opening in the exhaust head. This rim has annular side flanges 55 and 56 of unequal width which are disposed parallel with plates 48 and 49 and extend to a point near the flanges 50 and 51. The element is thus provided with two annular rotating pumping chambers of different radial depths and capacity which communicate through ports 57 in the web 53 near the rim. A spiral thread or projection 58 surrounds the rim 54, acting to force the liquid in the chamber 47 outwardly with sufficient power to cause it to flow against the atmospheric pressure A (Fig. 2) over the rim and between flanges 56 and 51 and enter the inlet side of the centrifugal pump. Here the rotation of the pump element places the liquid under such a pressure as to cause it to flow through and seal the ports 57 and discharge itself into the clearance between flanges 55 and 50, priming the same and flowing outward to a point where the spiral pump 58 again takes effect on it. I thus provide a body of liquid which circulates under the combined pump and centrifugal powers and effectively seals the shaft joint.

I provide the portion 52 of the shaft with a spiral thread 59 disposed opposite the flange 51 and coöperating therewith to form a spiral pump which arrests and throws back into circulation any liquid which may fall on the shaft. This foregoing description applies equally to the liquid packing used at the high pressure end of the turbine, except that the web 53 of the pump element is here shown as formed integral with or attached to the nut 14. These liquid packings may be adapted to operate between any ordinary differences in pressure.

It will be noted that the liquid packing at the high pressure end of the turbine will act as a condenser on the steam which leaks past the high pressure ring packing and will thus maintain its supply of sealing liquid. The surplus water may be drawn off through the passage 60 and pipe 61 in any desired manner, such as through a trap. The automatic action of the ring packing will maintain a substantially constant pressure on the inner side of the liquid packing. This is of importance as it does not then require the liquid seal to be adapted to withstand such wide variations in pressure as may occur otherwise.

I provide the ring chamber with which the passage 23 communicates with a pressure indicating means, such as a gage 62 connected to said chamber by a passage 63. By means of the screws 28, the tension on spring 26 may be varied and the packing adjusted until the gage indicates the predetermined pressure in said ring chamber.

In accordance with the patent statutes I have thus described in illustrative embodiment of my invention, but it is to be understood that it may be variously modified within the scope of the claims hereinafter defining my invention.

What I claim as new and desire to secure by Letters Patent, is:—

1. In a fluid motor, a packing for the high pressure which comprises moving and stationary parts between which the leakage fluid, as it flows, is gradually expanded, in combination with means responsive to pressure variations of said fluid which automatically governs its flow at different points through said packing.

2. In a turbine, a casing, rotatable parts therein, and a high pressure packing between said casing and parts comprising a tortuous gland; and a fluid motor which responds to variations in the pressure of the leakage fluid acted upon by said gland and automatically adjusts the clearances in said gland.

3. In a turbine, a casing, rotating parts, and a high pressure packing between said casing and parts which comprises a compound packing element which rotates with said parts fixed packing devices coöperating with said element, and means movable sensitive to changes in the pressure of the leakage fluid acted on by said packing, which are adapted to automatically adjust said rotatable element.

4. The combination with a rotating shaft, of a packing therefor comprising stationary and rotatable annular parts which are interleafed, spring means tending to open the clearances between said parts, and means automatically sensitive to pressure conditions, which oppose the opening of said clearances.

5. In a turbine, a casing, a rotatable element, and a packing between said element and casing comprising relatively adjustable parts between which annular chambers are formed for the expansion of the leakage fluid in stages, and means responsive to pressure variations of the leakage fluid in one of said stages which tend to maintain the several packing stage pressures substantially constant.

6. In a turbine, a packing at the high pressure end thereof comprising a plurality of annular chambers into which the leakage fluid flows successively, in combination with means to reduce said leakage by automatically throttling its flow, which coöperate with means to draw off parts of said fluid for use in the turbine, said throttling means acting responsive to the leakage fluid pressure in one of said chambers.

7. In a turbine, rotating buckets and stationary guide devices forming a working passage for the motor fluid, in combination with a tortuous packing means for the high pressure end of said turbine comprising a plurality of annular chambers through which the leakage fluid flows, passages to establish communication between said successive chambers and successive points in said working passage, and a multiported valving element forming part of said packing means and acting automatically to maintain the pressure at the packing end of said passages superior to that at their turbine or discharge ends.

8. In a turbine, the combination with a shaft and a high pressure packing therefor, of agencies to successively reduce the volume and pressure of the leakage fluid in the packing by throttling it and discharging portions thereof into the turbine, the throttling means comprising a ring sleeve adjusted by the leakage fluid under its control for the purpose of automatically regulating the pressure of said leakage fluid in the packing.

9. In a turbine, rotatable parts and a packing means for said parts at the high pressure end of the turbine comprising a self adjusting throttling packing which governs the leakage of pressure therethrough, and a liquid packing between the atmosphere and the fluid which leaks past said self adjusting packing, for the purposes described.

10. In a turbine, rotatable parts, a casing surrounding said parts, liquid packing means for said parts disposed at the high and low pressure ends of said casing, in combination with a throttling packing having governed positions of rest intermediate its range of travel which is interposed between the high pressure fluid in the turbine and the adjacent liquid packing, and means to substantially equalize the internal pressures to which said liquid packings are exposed.

11. In a turbine, rotatable parts, a casing surrounding said parts, a self adjusting throttling packing between said parts and casing, and passages leading from said packing into the turbine which are throttled by said packing, in combination with a liquid packing for said parts which is exposed to the fluid leaking past said self adjusting packing, and a free passage uneffected by the movements of said latter packing which leads from a point between said packings to the low pressure end of the turbine.

12. In a turbine, a casing, rotatable parts therein, a high pressure packing for said parts, a fluid motor movable responsive to pressure changes in said packing, and leverage means to transmit movement from said motor to an adjustable part of said packing for the purpose of governing the leakage therein.

13. In a turbine, a casing, rotatable fluid driven devices therein, a shaft supporting said devices and passing through said casing, a high pressure packing for said shaft, a fluid motor controlled by the leakage fluid acted upon by said packing, and leverage means to transmit movement from the motor to said shaft to adjust the latter longitudinally for the purposes described.

14. In a turbine having a working passage comprising fixed guide devices and rotating buckets, rotatable bucket supporting means, a casing, means to supply motor fluid to the turbine, and packing means to hold the fluid in said working passage comprising a self adjusting packing at the high pressure end of said turbine, and means to pack clearances between said guide devices and bucket supporting means comprising passages to discharge fluid exhausted from said packing into said clearances.

15. In an elastic fluid turbine, a casing, rotatable parts inclosed therein, a tortuous packing means for the high pressure between said casing and rotatable parts, means to utilize the pressure at a predetermined point in said packing to automatically govern the leakage, gage means to indicate the pressure at said predetermined point, and hand controlled means to bring the governed leakage fluid at said point to the desired pressure.

16. In a turbine, a casing, rotatable parts therein, and a tortuous packing for said parts comprising rotatable and stationary elements, in combination with means to adjust by hand the clearances between said elements, means responsive to pressure variations of the leakage fluid to automatically adjust said clearances, and adjustable means to lock said elements in any fixed relation desired.

17. In a high pressure packing for turbine shafts, an interleafed gland, conduits leading from said gland to effect a drop of the leakage fluid therein, a liquid seal at the low pressure end of the said gland, and a passage leading from a point between said seal and gland for the purpose of dropping the internal pressure of the leakage fluid to which said seal is exposed.

18. In combination with a turbine and its shaft, a mechanical packing which reduces the pressure of the leakage fluid in stages, a liquid sealing means disposed between the atmosphere and low pressure end of said packing, and means to draw off the fluid-pressure leaking entirely past said packing and protect said liquid seal against high internal pressures.

19. A liquid packing for rotating shafts, comprising a packing chamber, a body of liquid therein, an element rotatable with the shaft and disposed within said chamber and comprising a web body portion connected to a flanged rim, ports through the web, and a spiral rib carried by the rim and adapted to move in close proximity to the adjacent circumferential wall of the packing chamber, substantially as described.

20. A liquid packing for a rotating shaft, comprising a stationary chamber supplied with a sealing liquid, a rotatable pump element therein, communicating chambers in said element through which sealing liquid flows under centrifugal pressure, a clearance in the chamber surrounding said pump element, and a spiral pump means acting in said clearance to induce a positive circulation of said liquid against the pressure to be packed against.

In testimony whereof I have hereunto set my hand in presence of two subscribing witnesses.

JAMES WILKINSON.

Witnesses:
JAMES H. NOLAN,
JOSEPH A. CONDRY.

---

Correction in Letters Patent No. 861,926.

It is hereby certified that the name of the State of incorporation of the assignee in Letters Patent No. 861,926, granted July 30, 1907, upon the application of James Wilkinson, of Providence, Rhode Island, for an improvement in "Packing for Rotary Motors," was erroneously written and printed "Indiana," whereas said name should have been written and printed *Alabama;* and that the said Letters Patent should be read with this correction therein that the same may conform to the record of the case in the Patent Office.

Signed and sealed this 22d day of October, A. D., 1907.

[SEAL.]

C. C. BILLINGS,
*Acting Commissioner of Patents.*

10. In a turbine, rotatable parts, a casing surrounding said parts, liquid packing means for said parts disposed at the high and low pressure ends of said casing, in combination with a throttling packing having governed positions of rest intermediate its range of travel which is interposed between the high pressure fluid in the turbine and the adjacent liquid packing, and means to substantially equalize the internal pressures to which said liquid packings are exposed.

11. In a turbine, rotatable parts, a casing surrounding said parts, a self adjusting throttling packing between said parts and casing, and passages leading from said packing into the turbine which are throttled by said packing, in combination with a liquid packing for said parts which is exposed to the fluid leaking past said self adjusting packing, and a free passage uneffected by the movements of said latter packing which leads from a point between said packings to the low pressure end of the turbine.

12. In a turbine, a casing, rotatable parts therein, a high pressure packing for said parts, a fluid motor movable responsive to pressure changes in said packing, and leverage means to transmit movement from said motor to an adjustable part of said packing for the purpose of governing the leakage therein.

13. In a turbine, a casing, rotatable fluid driven devices therein, a shaft supporting said devices and passing through said casing, a high pressure packing for said shaft, a fluid motor controlled by the leakage fluid acted upon by said packing, and leverage means to transmit movement from the motor to said shaft to adjust the latter longitudinally for the purposes described.

14. In a turbine having a working passage comprising fixed guide devices and rotating buckets, rotatable bucket supporting means, a casing, means to supply motor fluid to the turbine, and packing means to hold the fluid in said working passage comprising a self adjusting packing at the high pressure end of said turbine, and means to pack clearances between said guide devices and bucket supporting means comprising passages to discharge fluid exhausted from said packing into said clearances.

15. In an elastic fluid turbine, a casing, rotatable parts inclosed therein, a tortuous packing means for the high pressure between said casing and rotatable parts, means to utilize the pressure at a predetermined point in said packing to automatically govern the leakage, gage means to indicate the pressure at said predetermined point, and hand controlled means to bring the governed leakage fluid at said point to the desired pressure.

16. In a turbine, a casing, rotatable parts therein, and a tortuous packing for said parts comprising rotatable and stationary elements, in combination with means to adjust by hand the clearances between said elements, means responsive to pressure variations of the leakage fluid to automatically adjust said clearances, and adjustable means to lock said elements in any fixed relation desired.

17. In a high pressure packing for turbine shafts, an interleafed gland, conduits leading from said gland to effect a drop of the leakage fluid therein, a liquid seal at the low pressure end of the said gland, and a passage leading from a point between said seal and gland for the purpose of dropping the internal pressure of the leakage fluid to which said seal is exposed.

18. In combination with a turbine and its shaft, a mechanical packing which reduces the pressure of the leakage fluid in stages, a liquid sealing means disposed between the atmosphere and low pressure end of said packing, and means to draw off the fluid-pressure leaking entirely past said packing and protect said liquid seal against high internal pressures.

19. A liquid packing for rotating shafts, comprising a packing chamber, a body of liquid therein, an element rotatable with the shaft and disposed within said chamber and comprising a web body portion connected to a flanged rim, ports through the web, and a spiral rib carried by the rim and adapted to move in close proximity to the adjacent circumferential wall of the packing chamber, substantially as described.

20. A liquid packing for a rotating shaft, comprising a stationary chamber supplied with a sealing liquid, a rotatable pump element therein, communicating chambers in said element through which sealing liquid flows under centrifugal pressure, a clearance in the chamber surrounding said pump element, and a spiral pump means acting in said clearance to induce a positive circulation of said liquid against the pressure to be packed against.

In testimony whereof I have hereunto set my hand in presence of two subscribing witnesses.

JAMES WILKINSON.

Witnesses:
JAMES H. NOLAN,
JOSEPH A. CONDRY.

---

It is hereby certified that the name of the State of incorporation of the assignee in Letters Patent No. 861,926, granted July 30, 1907, upon the application of James Wilkinson, of Providence, Rhode Island, for an improvement in "Packing for Rotary Motors," was erroneously written and printed "Indiana," whereas said name should have been written and printed *Alabama;* and that the said Letters Patent should be read with this correction therein that the same may conform to the record of the case in the Patent Office.

Signed and sealed this 22d day of October, A. D., 1907.

[SEAL.]

C. C. BILLINGS,
*Acting Commissioner of Patents.*

It is hereby certified that the name of the State of incorporation of the assignee in Letters Patent No. 861,926, granted July 30, 1907, upon the application of James Wilkinson, of Providence, Rhode Island, for an improvement in "Packing for Rotary Motors," was erroneously written and printed "Indiana," whereas said name should have been written and printed *Alabama;* and that the said Letters Patent should be read with this correction therein that the same may conform to the record of the case in the Patent Office.

Signed and sealed this 22d day of October, A. D., 1907.

[SEAL.]

C. C. BILLINGS,
*Acting Commissioner of Patents.*